Nov. 29, 1960  F. P. DUNIGAN  2,961,808
MACHINE TOOL WITH LOAD CONTROL
Filed March 10, 1958
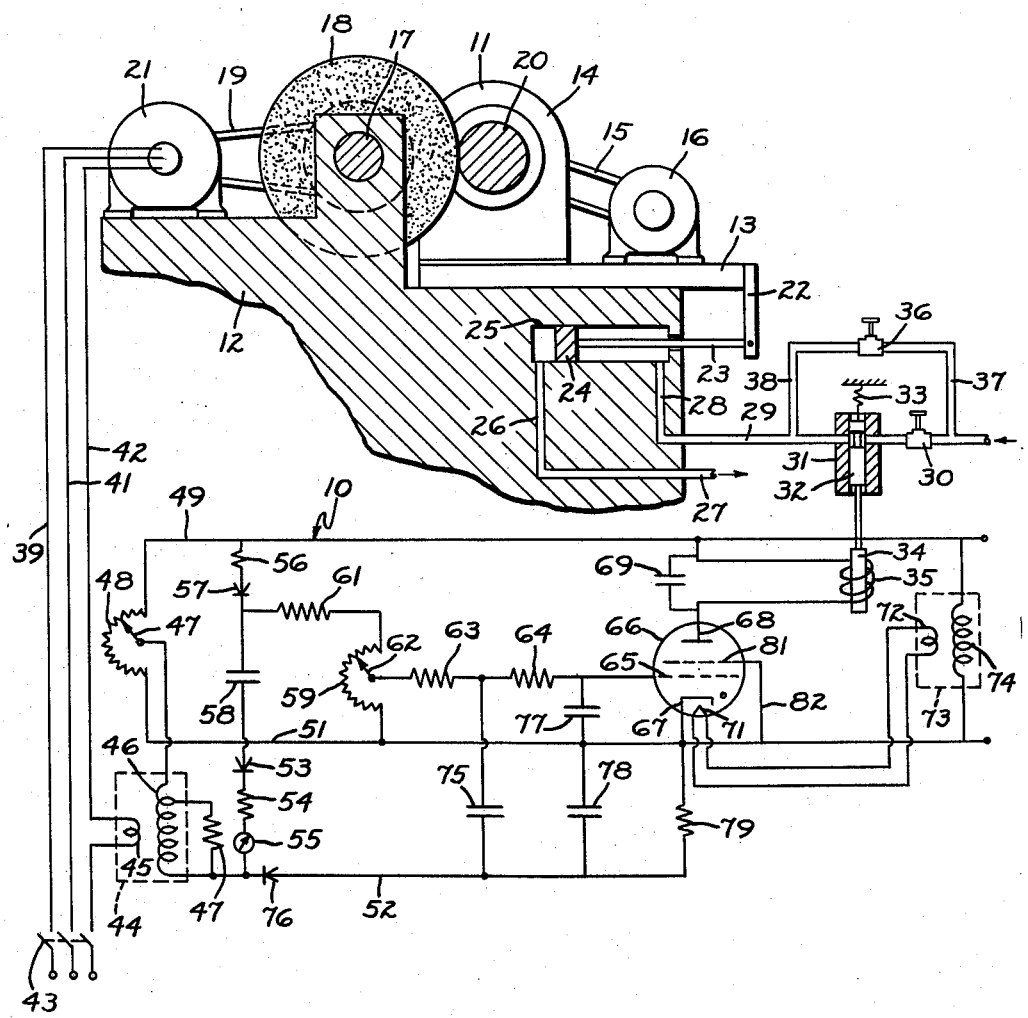
INVENTOR.
Francis P. Dunigan
BY
Norman S. Blodgett
Attorney United States Patent Office 2,961,808
Patented Nov. 29, 1960

2,961,808
MACHINE TOOL WITH LOAD CONTROL

Francis P. Dunigan, Holden, Mass., assignor to Machinery Electrification, Inc., Northboro, Mass., a corporation of Massachusetts Filed Mar. 10, 1958, Ser. No. 720,188
6 Claims. (Cl. 51—165)

This invention relates to a load control and more particularly to apparatus for bringing about a change in condition of a machine tool or the like when the load varies from a predetermined value.

There are many occasions in providing for the control of a machine tool when it is desirable to relate the control to the load which is required to drive the tool. Such a situation occurs, for instance, in a grinding machine in which it may be desirable at times to change the feed rate at the instant of contact of the wheel with the work piece. More specifically, in a grinding machine such a load control may be used to change the feed from a high speed as the wheel approaches the work to a low speed after the wheel has made contact with the work. In the past, controls of this kind have operated in such a manner that the load control trips at a current rating of the grinding machine motor just above the normal idle current of the grinding wheel. When the grinding wheel contacts the work, the motor load builds up, the load control trips, and a suitable mechanism makes the necessary speed change in the feed mechanism. Controls of this type, however, have not been entirely successful. For instance, in the case of the grinding machine, as the wheel changes in size or as different size wheels are used on the grinding machine, it is necessary to re-adjust the load control because of the fact that the "idling" of the wheelhead motor and its drive system will have changed. The change in bearing friction in the wheelhead itself changes from the time the machine is operated cold to the time when it is well warmed up. It can be seen, then, that in a motor control of the old type using simple load any change taking place in the machine tool which would effect the absolute value of load would require an adjustment in the control. This and other difficulties experienced with the prior art devices have been obviated in a novel manner by the present invention.

It is, therefore, an outstanding object of the present invention to provide a load control which operates on the basis of the increase in load current without regard to any particular absolute current setting.

Another object of the invention is the provision of a load control which does not require adjustment if the absolute value of load varies due to temperature effects, wear of the tool, and the like.

A still further object of this invention is the provision of a load control for grinding machine which is inexpensive to manufacture and which requires no adjustment other than an initial setting of control points and in which the operator can change wheel sizes, the amount of coolant flow, the wheel pressure, etc. without necessitating readjustment of the load control.

With these and other objects in view, as will be apparent to those skilled in the art, the invention resides in the combination of parts set forth in the specification and covered by the claims appended hereto.

The character of the invention, however, may be best understood by reference to certain of its structural forms, as illustrated by the accompanying drawing, in which:

The single figure represents a view of a load control applied to a machine tool embodying the principles of the present invention.

Referring to the drawing, the load control, indicated generally by the reference numeral 10, is shown in use with a machine tool 11 which is indicated as being a grinding machine. The grinding machine consists of a base 12 on which is suitably mounted on the table 13 and moves with it and is driven through a belt 15 by an electric motor 16. A shaft 17 is rotatably carried on the base 12 and has mounted thereon an abrasive wheel 18. The wheel is driven through a flexible belt 19 by an electric motor 21 which is also mounted on the base 12.

The table 14 is provided with a dependent finger 22 which is connected to a piston rod 23 with a piston 24 slidably movable in a cylinder 25. The piston 23 and the cylinder 25 make up a hydraulic linear actuator of the well-known type. A passage 26 leads from the inboard end of the cylinder 25 and is connected to a conduit 27 leading to a hydraulic pump, not shown. The other end of the cylinder 25 is connected to a passage 28 connected to a conduit 29 which is connected through a solenoid-actuated valve 31 and an adjustable valve 32 to a source of hydraulic fluid, not shown. The valve 31 consists of a plunger 32 which is maintained in normally-open position by means of a spring 33. The plunger 32 is connected to a solenoid 34 including an electrical coil 35. An adjustable valve 36 is connected by conduits 37 and 38 to bypass the valves 31 and 30 on occasion.

The electric motor 21 is connected through lines 39, 41, and 42 to a 3-way switch 43 which, in turn, is connected to a source of 3-phase, alternating electrical power, not shown. One of the power lines such as the line 42 is provided with a current transformer 44 consisting of a primary coil 45 and a secondary coil 46. Across the secondary coil 46 is connected a resistor 47. One end of the secondary coil 46 is connected to a selector arm 47 of a potentiometer 48. One end of the potentiometer 48 is connected to a line 49 the other end of which is connected to a source of alternating current, not shown. The other end of the potentiometer 48 is connected to a line 51 which is connected to the other pole of the last-mentioned source of alternating current electricity. The end of the secondary coil 46 of the transformer 44 which is not connected to the selector arm 47 of the potentiometer is connected to a line 52.

Between the lines 51 and 52 are connected in series a rectifier 53, a resistor 54, and a milliommeter 55 for measuring a null. Between the lines 49 and 51 are connected in series a resistor 56, a rectifier 57, and a capacitor 58. A potentiometer 59 is connected at one end to the line 51 and at the other end through a resistor 61 to the common point enjoyed by the rectifier 57 and the capacitor 58.

The selector arm 62 of the potentiometer 59 is connected through a resistor 63 and a resistor 64 to the control grid 65 of a thyratron 66. The cathode 67 of the thyratron is connected directly to the line 51. The plate 68 of the thyratron is connected to one side of the coil 35 the other side of which is connected to the line 49. A capacitor 69 is connected across the coil 35. The heater filament 71 of the thyratron is connected at its ends to the ends of a secondary coil 72 of a transformer 73. The primary coil 74 of the transformer 73 is connected between the lines 49 and 51 and, therefore, across the source of alternating current electricity.

A capacitor 75 is connected between the line 52 and the common point shared by the two resistors 63 and 64. A rectifier 76 is connected in the line 52 between the point of connection thereto of the capacitor 75 and the connection of the meter 55 thereto. The grid 65 of the thyratron 66 is connected to the line 51 by a capacitor 77. The line 51 is connected to the line 52 by a capacitor 78. Also connected between the lines 51 and 52 is a resistor 79. The other grid 81 of the thyratron 66 is connected directly to the line 51 by a lead 82.

It should be noted that in this particular application of the invention the valve 30 and the valve 31 permit a fairly large flow of hydraulic fluid therethrough whereas the valve 36 is of a somewhat restricted nature. Furthermore, the energization of the coil 45 maintains the solenoid plunger within the coil and also maintains the plunger 32 in such an aspect to the body of the valve 31 that the flow of fluid is permitted therethrough; the failure of current to flow through the coil 35 causes the spring 33 to pull the plunger 32 into such a position that the valve 31 is closed to the flow of fluid and the only way in which fluid can reach the cylinder 25 is through the bypass formed by the valve 36 and the conduits 37 and 38. It should be observed also that the action of the cylinder 25 upon the piston 24 is such as to cause the table 13 to move over the base 12 and carry the wheel 18 into engagement with a workpiece 20 carried and rotated in the workhead 14.

The operation of the apparatus will now be readily understood in view of the above description. Electrical current from the source of three-phase current, not shown, passes through the switch 43 when it is closed and through the leads 39, 41 and 42 to the motor 21. The motor of course drives the wheel 18 through the belt 19 in the usual manner. Hydraulic fluid enters the system and by means of the movement of the piston 24 within the cylinder 25 causes the movement of the workpiece 20 into the wheel 18 for the grinding of a surface thereon. The amount of current passing through any one of the leads 39, 41 and 42 is generally proportional to the load on the motor; more accurately this is true after a certain value of reactive current has been subtracted. Therefore, the voltage in the secondary 46 of the transformer 44 is proportional to the load on the motor 21. The potentiometer 48 is provided to permit the operator to subtract from the absolute voltage thus obtained an amount sufficient to compensate for the reactive current. When this has been done, the resultant voltage closely approximates the load on the motor 21; the voltage between the lines 51 and 52 is, therefore, directly proportional to the load on the motor 21. The operator is able to make the adjustment for the reactive current by operating the machine with the wheel 18 out of contact with the workpiece 20 and adjusting for minimum current by means of the milliommeter 55 operating through the rectifier 53. The voltage appearing between the lines 51 and 52 is of an alternating character of course, and this is rectified by means of the rectifier circuit provided by the rectifier 76 and the capacitor 78 in the usual manner. Alternating current voltage originating in the alternating current source appears between the lines 49 and 51 also and this is rectified by means of the resistor 56, rectifier 57 and the capacitor 58 as well as the resistor 61, so that direct current voltage appears between the selector arm 62 of the potentiometer 59 and the line 51. This same voltage appears on the grid 65 of the thyratron 66. The voltage so appearing is selected as to be greater than the firing voltage of the thyratron, so that the thyratron is normally conductive, and so that current passes through the thyratron from the line 49 to the line 51 through the coil 35. In this way the coil is normally energized and the valve 31 is normally in its upper position to allow for rapid movement of the piston 24 within the cylinder 25. This, of course, provides for fast feed of the workpiece 20 against the abrasive wheel 18.

When the load on the motor 21 is suddenly increased, as would take place when the wheel 18 contacts the workpiece 20 during in-feed, the current in the line 42 increases suddenly and, therefore, the voltage appearing across the lines 51 and 52 also increases suddenly. Now, observing the capacitor 75, it will be understood that this sudden increase in voltage across the lines 51 and 52 causes a surge of current flow through the capacitor 75. This is because the current through a capacitor is directly proportional to the rate of change of voltage or, in other words, of the first differential of the voltage with respect to time. This surge of current passes through the resistor 63 and the segment of the potentiometer 59 which is connected to the line 51 and has the effect of reducing the voltage appearing on the grid 65. The operator had previously set the voltage on the grid 65 by means of the selector arm 62 of the potentiometer 59 in such a manner that the voltage was just above the firing voltage of the thyratron 66. Reduction of the voltage on the grid 65 thus causes a termination of firing of the thyratron 66 and the ceasing of current flow through the coil 35. This, in turn, permits the plunger 32 to move into a position such that hydraulic fluid does not flow therethrough; at that time the only way in which hydraulic fluid can reach the cylinder 25 is through the bypass circuit presented by the valve 36 and the conduits 37 and 38. As has been stated, the valve 36 has a small orifice so that the flow to the cylinder is very small and the movement of the table 13 to feed the workpiece 20 into the wheel is very slow. This is the effect desired in the case of a control of a grinding machine. It will be understood, of course, that the surge of current through the capacitor 75 is only proportional to the rate of change of the voltage between the lines 51 and 52. If, for any one of a number of reasons the load on the motor 21 changes slowly, this will have a very little effect on the capacitor 75 and will not result in the ceasing of conductance of the thyratron 66. The control, therefore, will not be sensitive to small changes in load on the motor caused by changes in bearing friction at different temperatures of operation of the machine tool, to changes in coolant temperature, to changes in the surface characteristics of the wheel or the workpiece, or to wear in the wheel and the like.

It will be understood, of course, that the selection of the values of the electrical components is quite important in this application in order to give the proper time constant. In a practical embodiment of the invention which has been successfully used the thyratron selected was a 502–A, the resistors 63 and 64 were 0.1 megohm, the capacitor 77 had a value .001 microfarad, while the capacitors 75 and 78 had a value of 1.0 microfarad; the resistor 79 had a value of .22 megohm.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described what is claimed as new and desired to secure by Letters Patent is:

1. A machine tool comprising a rotatable tool adapted to engage a workpiece, an electric motor for driving the tool, power lines connected to said motor, means attached to one of said power lines for obtaining a first continuous signal proportional at all times to the load on the tool, second means connected to the first-mentioned means for obtaining a second signal proportional to the rate of change of the first signal, and third means connected to the second means operative when the said second signal changes appreciably from a pre-determined value to change the operation of the tool to substantially change the load thereon.

2. A machine tool, comprising a rotatable tool adapted to engage a workpiece, an electric motor for driving the tool, means for obtaining a first continuous signal proportional at all times to the flow of the electrical current to the motor, means for obtaining a second signal indicative of the first differential of the said first signal with respect to time, and means operative when the said second signal exceeds a predetermined value to bring about changes in the tool to substantially change the value of the first signal.

3. A machine tool, comprising a rotatable tool adapted to engage a workpiece, an electric motor for driving the tool, means for obtaining a continuous first signal proportional at all times to the flow of electrical current to the motor, means for subtracting from the said first signal an amount sufficient to compensate for the reactive current supplied to the motor, means for obtaining a second signal indicative of the first differential with respect to time of the said first signal, means operative when the said second signal exceeds a predetermined value to bring about changes in the tool to reduce substantially the value of the load thereon.

4. A machine tool, comprising a rotatable tool adapted to engage a workpiece, an electric motor for driving the tool, means for obtaining a continuous first signal proportional at all times to the flow of electrical current to the motor, means for obtaining a second signal indicative of the first differential with respect to time of the said first signal, and means including a thyratron operative when the said second signal varies appreciably from a predetermined value to bring about changes in the tool to reduce substantially the value of the load thereon.

5. A machine tool, comprising a rotatable tool adapted to engage a workpiece, an electric motor for driving the tool, a current transformer for obtaining a continuous first signal proportional at all times to the flow of electrical current to the motor, means for subtracting from the said first signal an amount sufficient to compensate for the reactive current supplied to the motor, means including a capacitor for obtaining a second signal indicative of the rate of change of the said first signal, means including a thyratron operative when the said second signal varies from a predetermined range of values to bring about changes in the tool to reduce substantially the value of the load thereon.

6. A machine tool, comprising a rotatable tool adapted to engage a workpiece, an electric motor for driving the tool, power lines connected to the motor, a current transformer having a primary winding in series with one power line for obtaining a continuous first signal proportional at all times to the flow of electrical current to the motor, a potentiometer connected to a secondary winding of the current transformer to permit subtraction from the said first signal of an amount sufficient to compensate for the reactive current supplied to the motor, means including a thyratron connected to the tool operative in response to load to bring about changes in the tool to reduce substantially the value of the load, a capacitor connected to the grid of the thyratron and also connected to one side of the secondary winding to be subjected to the compensated first signal, a resistor in the grid circuit of the thyratron subject to flow of current through the capacitor when the said first signal changes at a rate exceeding a predetermined rate, and a potentiometer connected into the grid circuit of the thyratron to permit adjustment of the firing point thereof.

References Cited in the file of this patent

UNITED STATES PATENTS

| | | |
|---|---|---|
| 2,348,581 | Waldron | May 9, 1944 |
| 2,690,034 | Laverdisse | Sept. 28, 1954 |
| 2,758,426 | Comstock | Aug. 14, 1956 |
| 2,797,532 | Lowe | July 2, 1957 |
| 2,924,913 | Klar et al. | Feb. 16, 1960 |